United States Patent
Takeda et al.

(10) Patent No.: US 11,012,183 B2
(45) Date of Patent: May 18, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/469,238

(22) PCT Filed: Dec. 14, 2017

(86) PCT No.: PCT/JP2017/044817
§ 371 (c)(1),
(2) Date: Jun. 13, 2019

(87) PCT Pub. No.: WO2018/110618
PCT Pub. Date: Jun. 21, 2018

(65) Prior Publication Data
US 2020/0106546 A1    Apr. 2, 2020

(30) Foreign Application Priority Data

Dec. 14, 2016  (JP) .............................. JP2016-242218

(51) Int. Cl.
*H04L 1/00*  (2006.01)
*H04L 5/00*  (2006.01)
(Continued)

(52) U.S. Cl.
CPC ............ *H04L 1/003* (2013.01); *H04L 1/1819* (2013.01); *H04L 5/0051* (2013.01);
(Continued)

(58) Field of Classification Search
CPC ..... H04L 1/003; H04L 1/1819; H04L 5/0051; H04L 5/0055; H04W 28/06; H04W 72/04; H04W 72/0413; H04W 80/08
(Continued)

(56) References Cited

U.S. PATENT DOCUMENTS

2013/0294299 A1* 11/2013 Park .................. H04L 5/001
                                                    370/280
2015/0110067 A1*  4/2015 Kim .................. H04W 72/0413
                                                    370/330
(Continued)

OTHER PUBLICATIONS

International Search Report issued in PCT/JP2017/044817 dated Mar. 6, 2018 (1 page).
(Continued)

*Primary Examiner* — Gbemileke J Onamuti
(74) *Attorney, Agent, or Firm* — Osha Bergman Watanabe & Burton LLP

(57) ABSTRACT

The present invention is designed to adequately control the transmission of uplink control information (UCI) using UL control channels. According to the present invention, a user terminal has a transmission section that transmits uplink control information (UCI), and a control section that determines a format of an uplink (UL) control channel that is used to transmit the UCI, from a plurality of formats, including a first format, in which the UCI and a reference signal are frequency-division-multiplexed, and a second format, in which the UCI and the reference signal are time-division-multiplexed.

5 Claims, 15 Drawing Sheets

(51) Int. Cl.
*H04L 1/18* (2006.01)
*H04W 80/08* (2009.01)
*H04W 72/04* (2009.01)

(52) U.S. Cl.
CPC ......... *H04L 5/0055* (2013.01); *H04W 72/042* (2013.01); *H04W 72/0413* (2013.01); *H04W 80/08* (2013.01)

(58) Field of Classification Search
USPC ........................................................ 370/329
See application file for complete search history.

(56) References Cited

U.S. PATENT DOCUMENTS

2017/0041119 A1* 2/2017 Ang .................... H04W 72/042
2020/0068556 A1* 2/2020 Tiirola .................. H04L 5/0091

OTHER PUBLICATIONS

Witten Opinion of the International Searching Authority issued in PCT/JP2017/044817 dated Mar. 6, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

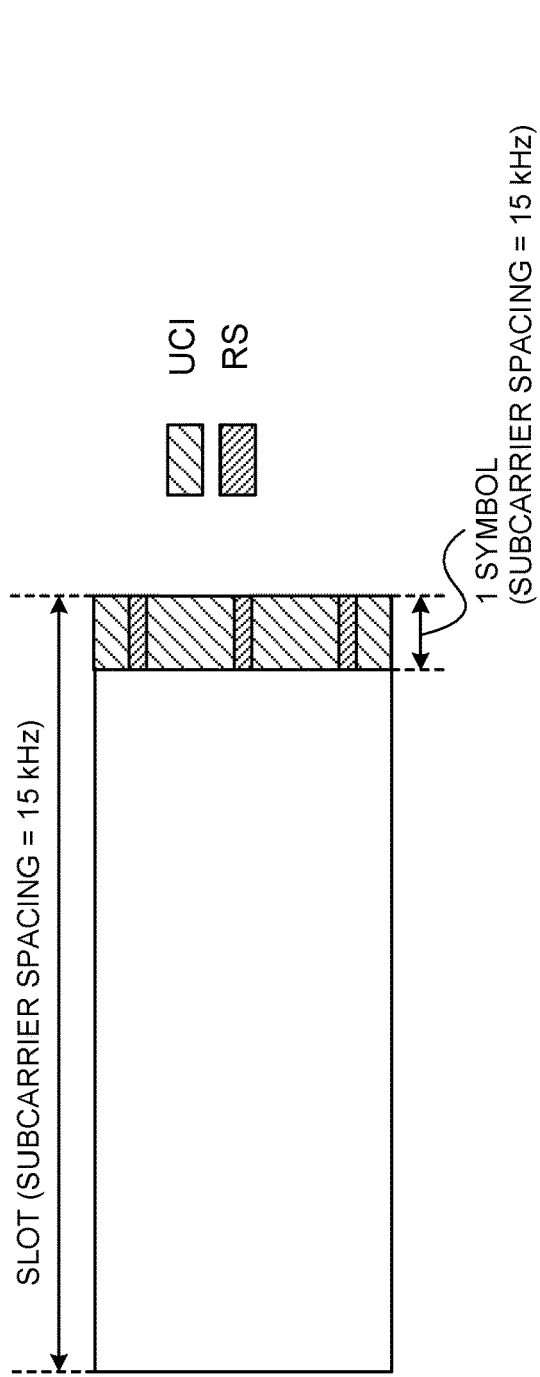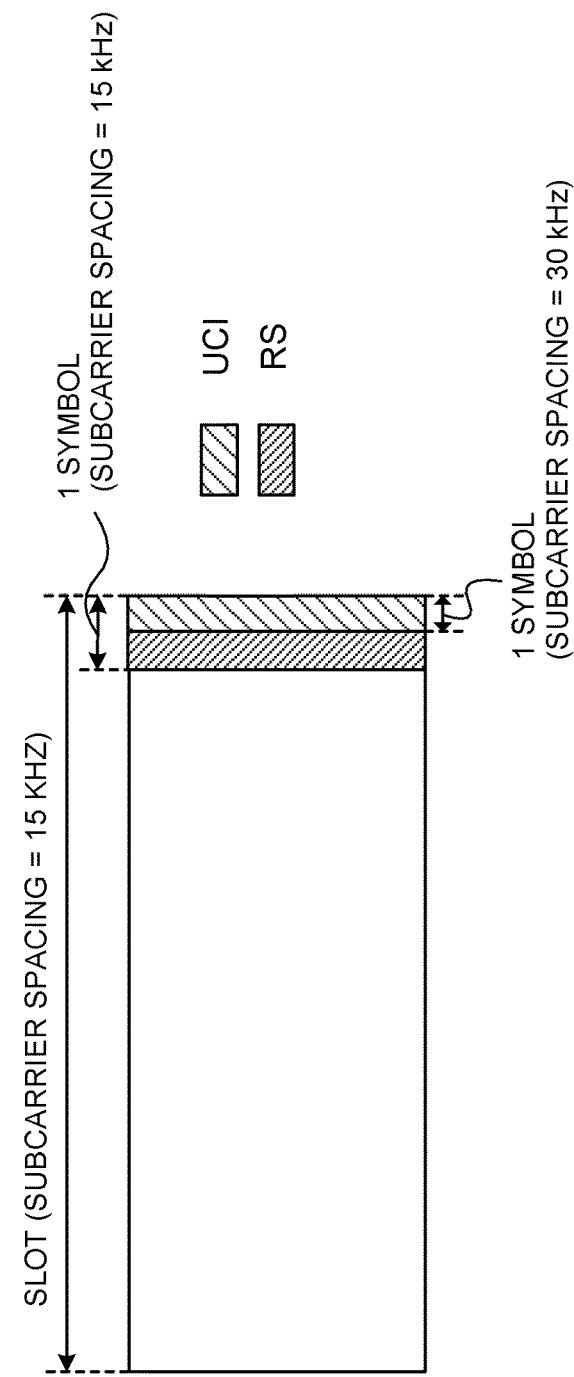

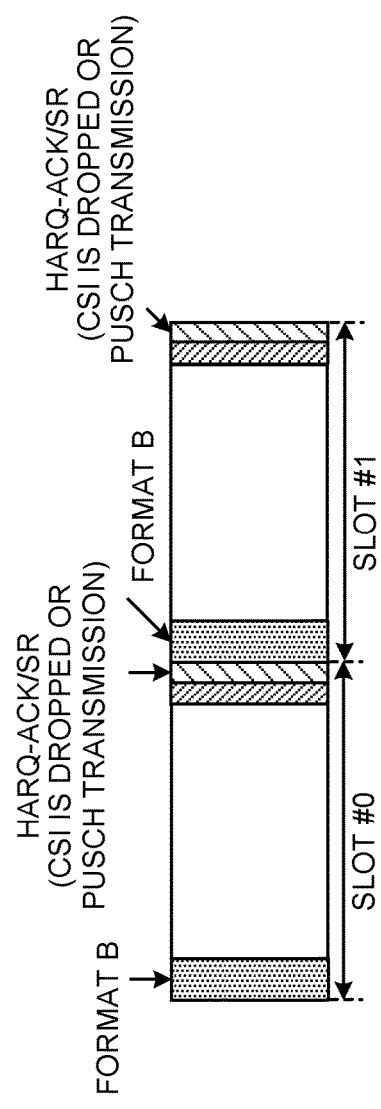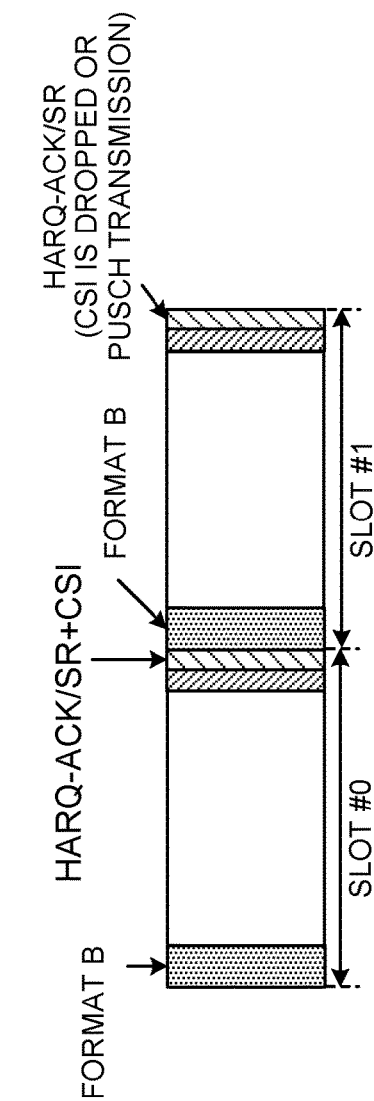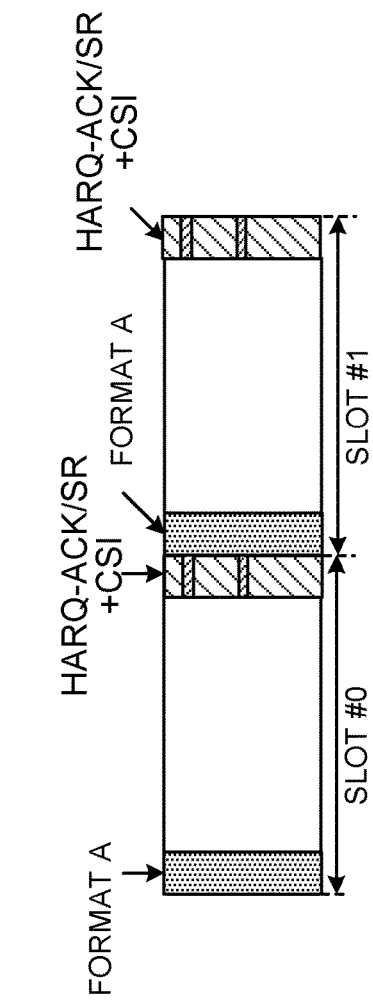

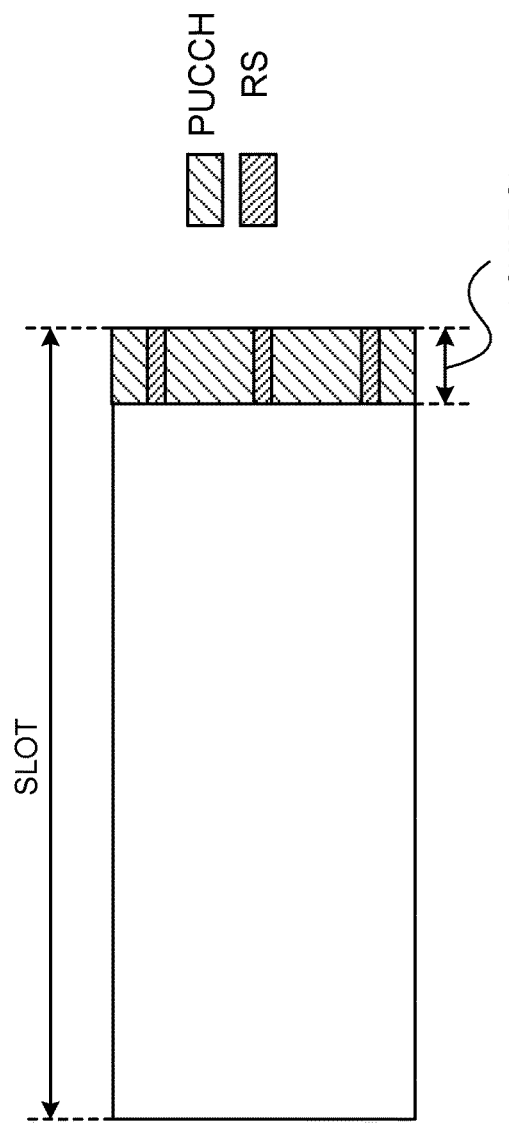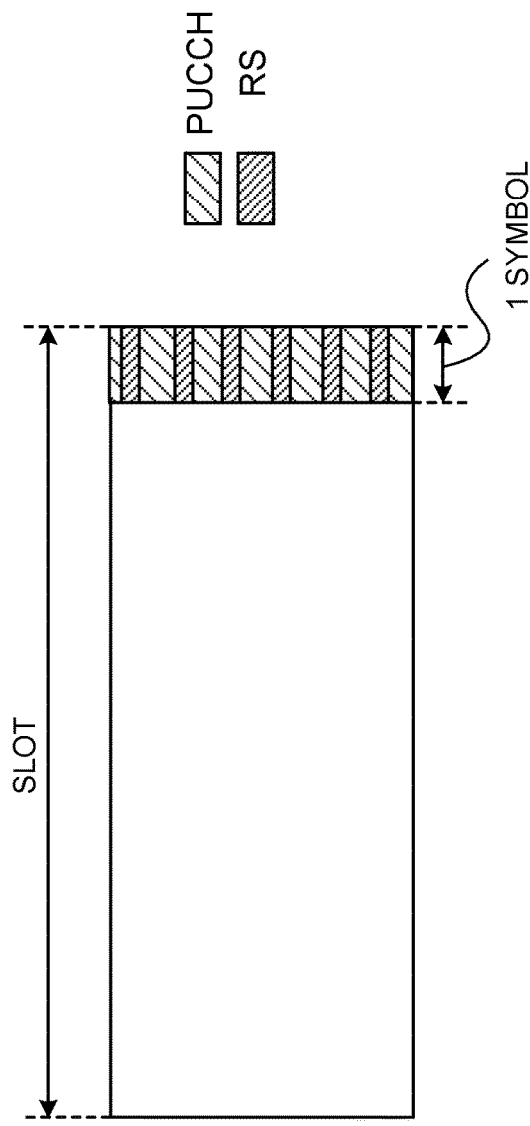
FIG. 6A
FIG. 6B

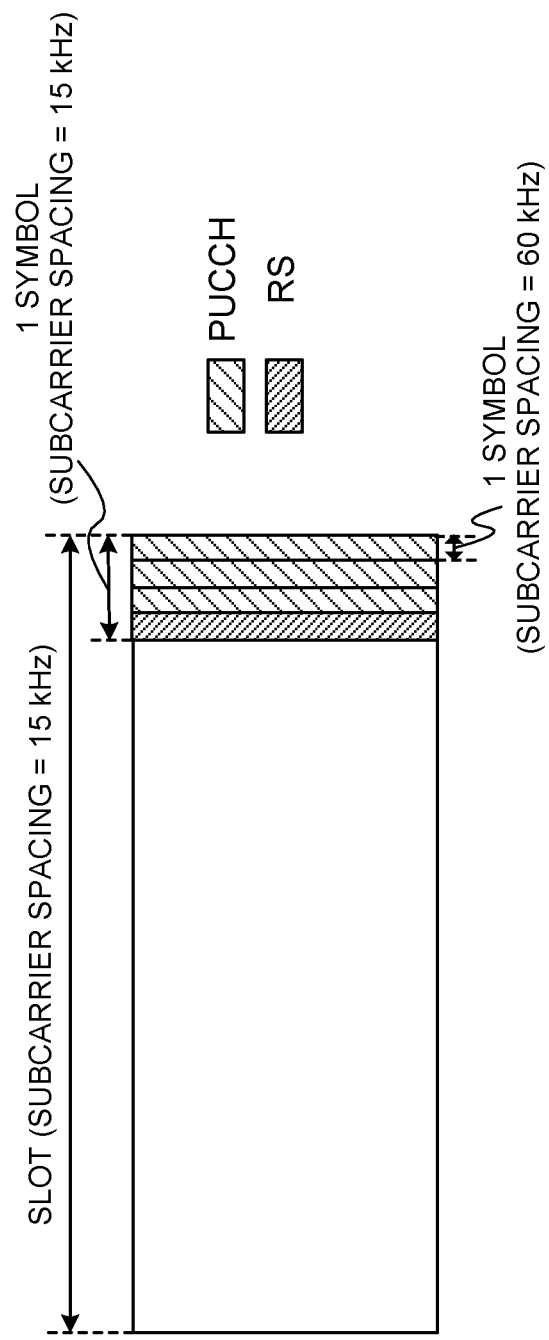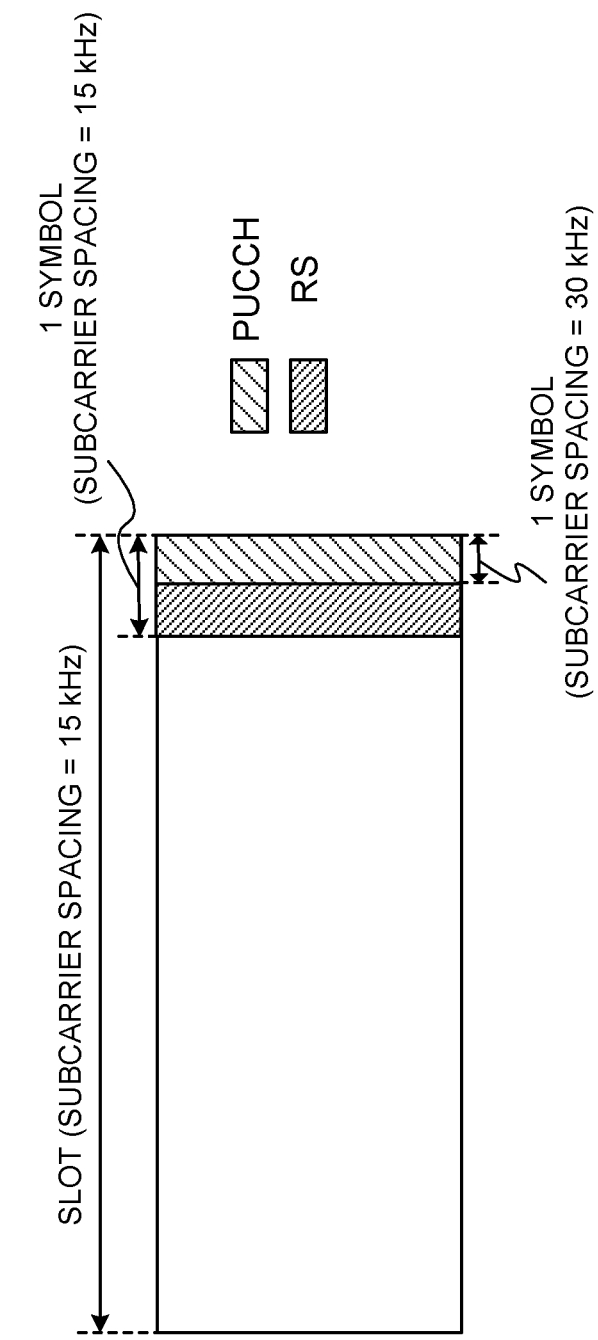

| PREDETERMINED FIELD VALUE OF DCI | FORMAT A | FORMAT B |
|---|---|---|
| 00 | TIMING n+A0 | FORMAT n+B0 |
| 01 | TIMING n+A1 | FORMAT n+B1 |
| 10 | TIMING n+A2 | FORMAT n+B2 |
| 11 | TIMING n+A3 | FORMAT n+B3 |

FIG. 8

| PREDETERMINED FIELD VALUE OF DCI | FORMAT A | FORMAT B |
|---|---|---|
| 00 | RESOURCE A0 | RESOURCE B0 |
| 01 | RESOURCE A1 | RESOURCE B1 |
| 10 | RESOURCE A2 | RESOURCE B2 |
| 11 | RESOURCE A3 | RESOURCE B3 |

FIG. 9

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using one-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

Also, in existing LTE systems (for example, LTE Rel. 8 to 13), a user terminal transmits uplink control information (UCI) by using a UL control channel (for example, PUCCH: Physical Uplink Control Channel) or a UL data channel (for example, PUSCH: Physical Uplink Shared Channel). The format of this UL control channel is referred to as "PUCCH format" and so on.

UCI includes at least one of a scheduling request (SR), retransmission control information (HARQ-ACK (Hybrid Automatic Repeat reQuest-Acknowledgement), ACK and/or NACK (Negative ACK)) in response to DL data (DL data channel (for example, PDSCH: Physical Downlink Shared Channel)), and channel state information (CSI).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

It is assumed that future radio communication systems (for example, LTE Rel. 14, LTE Rel. 15 (or later versions), 5G, NR, etc.) will transmit UCI using a UL control channel of a different format than existing LTE systems (for example, LTE Rel. 13 and/or earlier versions).

For example, the PUCCH formats for use in existing LTE systems are comprised of one-ms subframe units. Meanwhile, for future radio communication systems, a study is in progress to support a UL control channel having a shorter duration than existing LTE systems (hereinafter also referred to as a "short PUCCH"). In addition, this short PUCCH may accommodate a plurality of formats that, for example, use different methods of multiplexing reference signals (which are referred to as "RSs," and include, for example, the demodulation reference signal (DM-RS), which is used to demodulate UCI, the channel state sounding reference signal (SRS), and so on).

Thus, if multiple formats are supported for UL control channels (for example, a short PUCCH) of different formats than existing LTE systems, there is a risk that user terminals may not be able to properly control the transmission of UCI using these UL control channels.

The present invention has been made in view of the above, and it is therefore an object of the present invention to provide a user terminal and a radio communication method, whereby UCI transmission using UL control channels can be controlled adequately.

Solution to Problem

According to one aspect of the present invention, a user terminal has a transmission section that transmits uplink control information (UCI), and a control section that determines a format of an uplink (UL) control channel that is used to transmit the UCI, from a plurality of formats, including a first format, in which the UCI and a reference signal are frequency-division-multiplexed, and a second format, in which the UCI and the reference signal are time-division-multiplexed.

Advantageous Effects of Invention

According to the present invention, user terminals can adequately control the transmission of uplink control information (UCI) using UL control channels.

BRIEF DESCRIPTION OF DRAWINGS

FIGS. 2A and 2B provide diagrams, each showing an example of the format of a short PUCCH;

FIGS. 5A to 5C provide diagrams, each showing a third example of determining a format, according to the first aspect;

FIGS. 6A and 6B provide diagrams, each showing an example of controlling the RS density in format A, according to a second aspect of the present invention;

FIGS. 7A and 7B provide diagrams, each showing an example of controlling the RS density in format A, according to the second aspect;

FIG. 8 is a diagram to show an example of controlling the timing to feed back HARQ-ACK, according to a third aspect of the present invention;

FIG. 9 is a diagram to show an example of controlling short PUCCH resources, according to a fourth aspect of the present invention;

DESCRIPTION OF EMBODIMENTS

Future radio communication systems (for example, LTE Rel. 14, 15 and/or later versions, 5G, NR, etc.) are under study for introducing multiple numerologies (including, for example, subcarrier spacing and/or symbol duration), not a single numerology. For example, future radio communication systems may support multiple subcarrier spacings such as 15 kHz, 30 kHz, 60 kHz and 120 kHz.

Also, future radio communication systems are being studied to introduce time units (referred to as, for example, "subframes," "slots," "minislots," "subslots," "TTIs," "radio frames" and so on) that are the same as and/or different than existing LTE systems (LTE Rel. 13 or earlier versions), while supporting multiple numerologies.

For example, a subframe is a time unit that has a predetermined time duration (for example, one ms), regardless of what numerology a user terminal uses.

On the other hand, a slot is a time unit that is based on the numerology used by the user terminal. For example, if the subcarrier spacing is 15 kHz or 30 kHz, the number of symbols per slot may be seven or fourteen. Meanwhile, when the subcarrier spacing is 60 kHz or greater, the number of symbols per slot may be fourteen. In addition, a slot may include a plurality of minislots (subslots).

Generally, subcarrier spacing and symbol duration hold a reciprocal relationship. Therefore, as long as the number of symbols per slot (or minislot (subslot)) stays the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

For such future radio communication systems, studies are on-going to support a UL control channel (hereinafter also referred to as a "short PUCCH") that is structured to be shorter in duration than the PUCCH formats of existing LTE systems (for example, LTE Rel. 13 and/or earlier versions) and/or a UL control channel (hereinafter also referred to as a "long PUCCH") that is structured to have a longer duration than the above short duration.

Figure 1A:
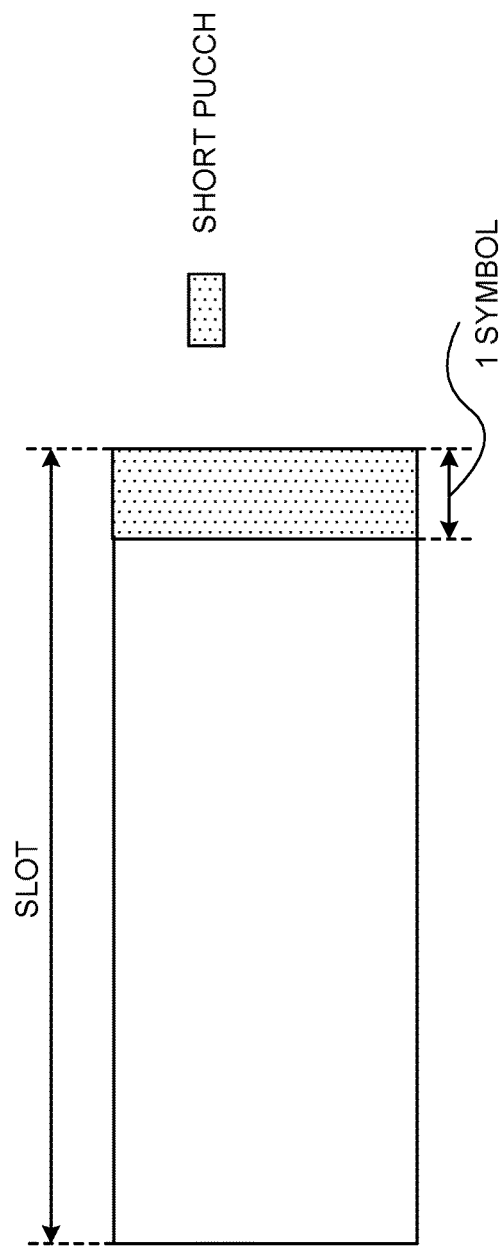
FIGS. 1A and 1B provide diagrams, each showing an example of the format of a UL control channel.
Figure 1B:
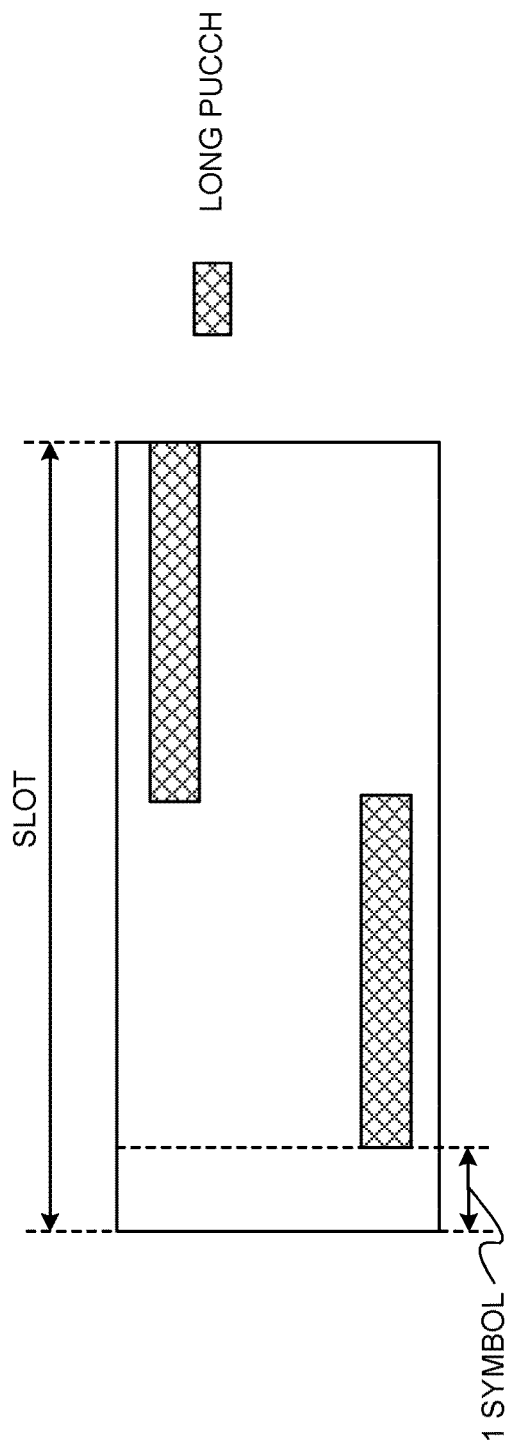

FIG. 1 provide diagrams, each showing an example of the format of a UL control channel in future radio communication systems. FIG. 1A shows an example of a short PUCCH, and FIG. 1B shows an example of a long PUCCH. As shown in FIG. 1A, a short PUCCH is arranged in a predetermined number of symbols (here, one symbol) from the end of a slot. Note that the symbol to arrange the short PUCCH is not confined to the end of a slot, and a predetermined number of symbols at the top or in the middle of a slot may be used as well. In addition, the short PUCCH may be placed in one or more frequency resources (for example, in one or more physical resource blocks (PRBs)).

Also, the short PUCCH may be time-division-multiplexed and/or frequency-division-multiplexed with a UL data channel (hereinafter also referred to as "PUSCH") in the slot. Also, the short PUCCH may be time-division-multiplexed and/or frequency-division-multiplexed with a DL data channel (hereinafter also referred to as "PDSCH") and/or a DL control channel (hereinafter also referred to as "PDCCH (Physical Downlink Control CHannel)") in the slot.

With the short PUCCH, a multi-carrier waveform may be used (for example, the OFDM (Orthogonal Frequency Division Multiplexing) waveform), or a single-carrier waveform may be used (for example, the DFT-s-OFDM (Discrete Fourier Transform-Spread-Orthogonal Frequency Division Multiplexing) waveform).

Meanwhile, as shown in FIG. 1B, a long PUCCH is arranged over a plurality of symbols in a slot so as to have improved coverage over a short PUCCH. Referring to FIG. 1B, this long PUCCH is not placed in a predetermined number of symbols (here, one symbol) at the top of the slot, but can be placed in a predetermined number of symbols at the top. In addition, the long PUCCH may be constituted by fewer frequency resources (for example, one or two PRBs) than a short PUCCH, so as to provide a power-boosting effect.

Also, the long PUCCH may be frequency-division-multiplexed with a PUSCH in the slot. In addition, the long PUCCH may be time-division-multiplexed with a PDCCH in the slot. Furthermore, as shown in FIG. 1B, frequency hopping may be applied to the long PUCCH per predetermined duration in the slot (for example, per minislot (subslot)). Also, the long PUCCH may be placed with a short PUCCH in the same slot. With the long PUCCH, a single-carrier waveform may be used (for example, the DFT-s-OFDM waveform).

In addition, a short PUCCH may accommodate a plurality of formats that, for example, use different methods of multiplexing reference signals (which are referred to as "RSs," and include, for example, the DM-RS, which is used to demodulate UCI, the SRS, and so on). FIG. 2 provide diagrams, each showing an example of a short PUCCH. FIG. 2A shows a format in which UCI and an RS are frequency-division-multiplexed (hereinafter also referred to as "format A"). Meanwhile, FIG. 2B shows a format in which UCI and an RS are time-division-multiplexed (hereinafter also referred to as "format B").

Now, cases will be described below, with reference to FIGS. 2A and 2B, where the basic subcarrier spacing (also referred to as "normal subcarrier spacing," "reference subcarrier spacing," etc.) is 15 kHz, and where a short PUCCH is constituted by one symbol provided at this normal subcarrier spacing. Note that the normal subcarrier spacing is not limited to 15 kHz.

As shown in FIG. 2A, when format A is used, UCI and an RS are mapped to different frequency resources (for example, subcarriers) in one symbol of normal subcarrier spacing. Note that, although, in FIG. 2A, a short PUCCH of format A is arranged in the last symbol in a slot of normal subcarrier spacing, the arrangement position in the slot is not limited to here. Format A may be formed with two or more symbols of normal subcarrier spacing.

Format A, shown in FIG. 2A, can reduce the overhead of RSs easily, and therefore is suitable for a larger UCI payload. Meanwhile, provided that the receiving process (for example, the FFT (Fast Fourier Transform), UCI demodulation, etc.) cannot be started until one symbol of normal subcarrier spacing has been received completely, format A may not be suitable for achieving shorter processing latency (shorter latency). Also, in format A, a multi-carrier waveform (for example, the OFDM waveform) may be used so as to allow frequency division multiplexing of UCI and an RS.

Meanwhile, as shown in FIG. 2B, format B is designed so that multiple symbols of a higher subcarrier spacing than the normal subcarrier spacing are arranged inside one symbol of normal subcarrier spacing. In format B, UCI and an RS are time-division-multiplexed in these multiple symbols provided of the high subcarrier spacing.

For example, in format B shown in FIG. 2B, two symbols of a subcarrier spacing of 30 kHz are arranged in a time period of one symbol of a subcarrier spacing of 15 kHz. In format B, UCI and an RS are both mapped in different symbols of a subcarrier spacing of 30 kHz. As shown in FIG. 2B, by mapping an RS in a symbol before UCI, the receiving process (for example, the demodulation of the UCI) can be started earlier.

With format B shown in FIG. 2B, it is possible to start the receiving process earlier than format A, and therefore format B is suitable for achieving shorter processing latency. Meanwhile, given that an RS needs to be arranged over the whole of a PRB that is allocated to a short PUCCH, format B may not be suitable for a larger UCI payload. Furthermore, when format B is used, there is no need to transmit UCI and an RS in multiple carriers, so that it may be possible to prevent the peak-to-average power ratio (PAPR) from increasing, by using a single-carrier waveform (for example, the DFT-s-OFDM waveform).

Although not shown in the drawings, when using format B, four symbols of a subcarrier spacing of 60 kHz or eight symbols of a subcarrier spacing of 120 kHz may be arranged in one symbol of a subcarrier spacing of 15 kHz.

Thus, if multiple formats including format A and format B are supported for a short PUCCH, there is a possibility that a user terminal is unable to adequately control the transmission of UCI using this short PUCCH. So, the present inventors have worked on the method for adequately controlling UCI transmission using a short PUCCH, and arrived at the present invention.

To be more specific, the present inventors have come up with ideas of appropriately determining the format of a short PUCCH for use in transmitting UCI (the first aspect), adequately controlling the density of RSs in this format (the second aspect), controlling the timing of UCI feedback in accordance with this format (the third aspect), and controlling the resource for the short PUCCH in accordance with this format (the fourth aspect). Note that each of the first to the fourth aspects above may be implemented alone, or at least two of them may be combined.

Now, the present embodiment will be described below in detail. Assume that, with the present embodiment, a user terminal supports one or more subcarrier spacings (for example, 15 kHz, 30 kHz, 60 kHz, 120 kHz, etc.). A short PUCCH may be constituted by a predetermined number of symbols (for example, one to three symbols) of normal subcarrier spacing. Although the normal subcarrier spacing in the following description will be 15 kHz, the normal subcarrier spacing is not limited to this.

(First Aspect)

According to the first aspect of the present invention, a user terminal determines the format of a UL control channel for use in transmitting UCI (for example, a short PUCCH) from among a plurality of formats, including format A, in which UCI and an RS are frequency-division-multiplexed (the first format), and format B, in which UCI and an RS are time-division-multiplexed (the second format). To be more specific, the user terminal may decide the above format based on at least one of the type of the UCI (UCI type), the payload of the UCI (UCI payload) and physical layer signaling (L1 signaling).

Now, examples of determining the format of a short PUCCH based on each of the UCI type, the UCI payload and physical layer signaling will be described below, in detail, as first to third examples of determining the format. Note that at least two of the first to the third examples of determining the format may be combined.

<First Example of Determining Format>

In the first example of determining the format, the user terminal determines the format of a short PUCCH based on the UCI type. Here, the UCI type refers to information representing the content of UCI that is transmitted from the user terminal, and is information to represent at least one of, for example, a scheduling request (SR), control information (HARQ-ACK) in response to DL data, channel state information (CSI), beam index information (BI) and a buffer status report (BSR).

For example, if the UCI type is HARQ-ACK and/or SR (hereinafter "HARQ-ACK/SR") (not including CSI), the user terminal may select format B, and transmit the HARQ-ACK/SR using a short PUCCH of this format B.

Also, if the UCI type is CSI (not including HARQ-ACK/SR), the user terminal may select format A, and transmit the CSI using a short PUCCH in this format A.

Also, when the UCI type is HARQ-ACK/SR and CSI, the user terminal may select format A or format B, and control the CSI to be transmitted and/or dropped based on the selected format (see (1), (1)' and (2) below)).

(1) When selecting format B, the user terminal transmits HARQ-ACK/SR using a short PUCCH of format B, and the user terminal may drop the CSI depending on whether simultaneous transmission of UCI and data is supported or not. For example, if this simultaneous transmission is not supported (or disabled), the user terminal may drop the CSI. On the other hand, if this simultaneous transmission is supported (or enabled), the user terminal may transmit the CSI by using a data resource (for example, a PUSCH).

Also, (1)' when selecting format B, the user terminal may decide, based on the overall number of bits of HARQ-ACK/SR and CSI (for example, HARQ-ACK/SR and CSI that are bundled in at least one of the space direction, the frequency direction and the time direction), whether or not to transmit all of the HARQ-ACK/SR and the CSI by using a short PUCCH of format B.

For example, if the overall number of bits of these HARQ-ACK/SR and CSI is not larger than a predetermined threshold, the user terminal may multiplex not only the HARQ-ACK/SR, but also the CSI, over format B, and transmit this. When, on the other hand, the overall number of bits is larger than the predetermined threshold, as mentioned earlier, the user terminal may transmit the HARQ-ACK/SR using a short PUCCH of format B, and drop the CSI, or transmit the CSI using a data resource (for example, a PUSCH). Here, the predetermined threshold may be, for example, the payload of format B or a predetermined value that is calculated based on this payload.

(2) When selecting format A, the user terminal may transmit the HARQ-ACK/SR and the CSI by using a short PUCCH of format A.

Note that one of above (1) (and/or above (1)') and above (2) (that is, either format A or format B) may be configured in user terminal by command information (for example, higher layer signaling) from the network (for example, a radio base station). Furthermore, one of above (1) and (1)' (that is, whether or not CSI transmission is allowed in format B) may be configured in the user terminal by command information (for example, higher layer signaling) from the network.

Also, in the event CSI is dropped, if there are a plurality of CSIs (for example, CSIs pertaining to a plurality of cells (component carriers (CCs)), it is possible to drop all of these multiple CSIs, or drop part of these multiple CSIs.

Figure 3A:
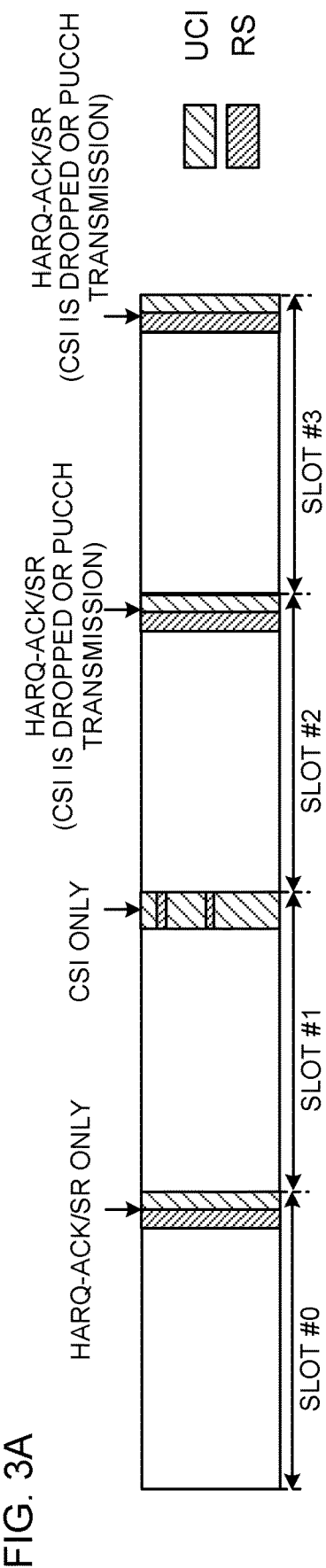
FIGS. 3A to 3C provide diagrams, each showing a first example of determining a format, according to a first aspect of the present invention.
Figure 3B:
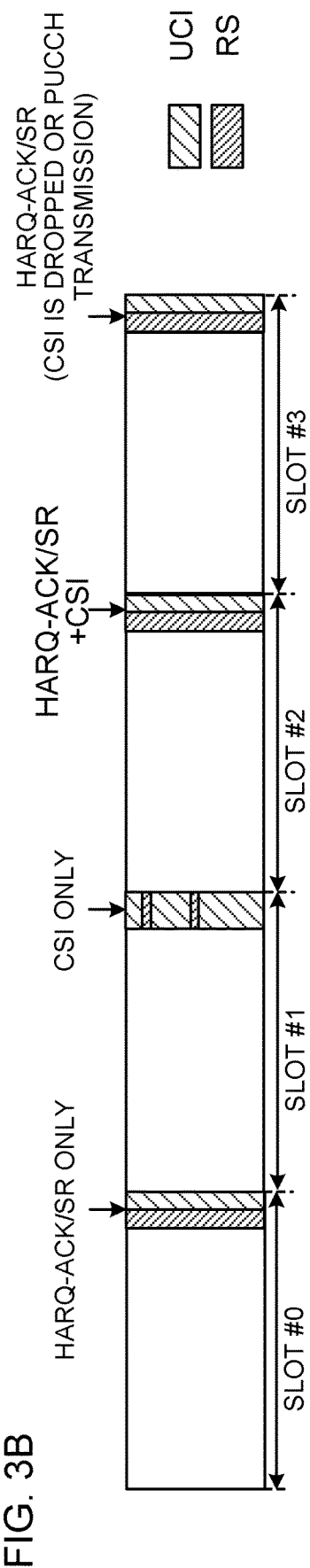
Figure 3C:
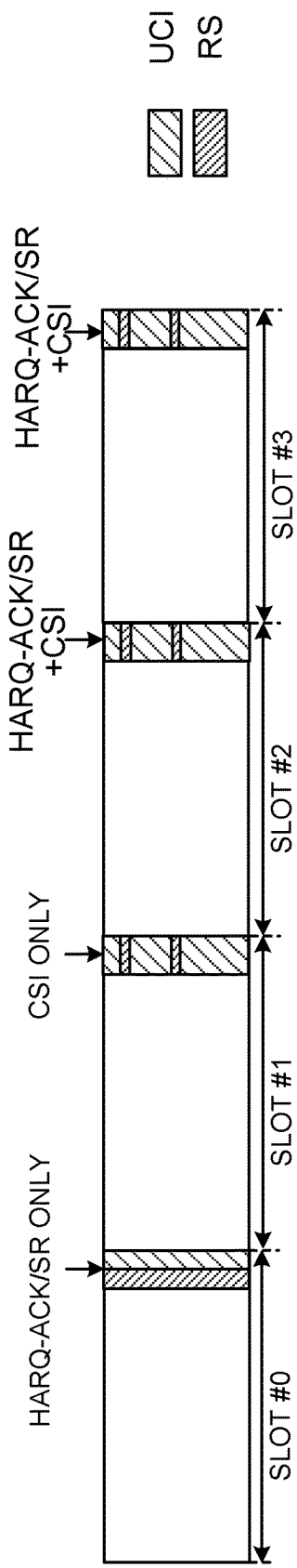

FIG. 3 provide diagrams, each showing a first example of determining the format according to the first aspect. In FIGS. 3A to 3C, the UCI type in slot #0 is HARQ-ACK/SR, the UCI type in slot #1 is CSI, and the UCI type in slots #2 and #3 is HARQ-ACK/SR and CSI. In FIGS. 3A to 3C, a short PUCCH is constituted by one symbol of normal subcarrier spacing (for example, 15 kHz).

In slot #0 in FIGS. 3A to 3C, the UCI type is HARQ-ACK/SR, so that format B is selected. When format B is used, even before the one symbol of normal subcarrier spacing that constitutes the short PUCCH is completely received, the receiving process can be started using the DM-RS that is placed in one symbol of a higher subcarrier spacing (for example, 30 kHz) than the normal subcarrier spacing. Consequently, the UCI, which imposes strict latency requirements, like HARQ-ACK, can be transmitted adequately. However, since the single-carrier waveform used does not allow the RS and the UCI to be frequency-division-multiplexed, the overhead is large.

Also, in slot #1 of FIGS. 3A to 3C, since the UCI type is CSI, format A is selected. When format A is used, the RS overhead is small and the payload can be increased, so that CSI, having a larger number of bits than HARQ-ACK/SR, can be transmitted properly. Also, the latency requirement for CSI is not strict compared to HARQ-ACK/SR, so that the use of format A, in which the receiving process cannot be started before one symbol having normal subcarrier spacing is completely received, has little impact.

In slots #2 and #3 shown in FIGS. 3A to 3C, the UCI type is HARQ-ACK/SR and CSI, where, in slot #2, the total number of bits of the HARQ-ACK/SR and the CSI is not greater than a predetermined threshold, and, in slot #3, the total number of these bits is greater than the predetermined threshold. In FIGS. 3A, 3B and 3C, above (1), (1)' and (2) are configured, respectively.

As shown in FIG. 3A, in the case of (1) above, in both of slot #2 and slot #3, the HARQ-ACK/SR is transmitted in a short PUCCH of format B, and the CSI is dropped or transmitted using a data resource (for example, a PUSCH), regardless of the total number of bits of the HARQ-ACK/SR and the CSI.

Meanwhile, as shown in FIG. 3B, in the case of (1)' above, in slot #2 where the total number of bits of the HARQ-ACK/SR and the CSI is not greater than a predetermined threshold, the HARQ-ACK/SR and the CSI are transmitted in a short PUCCH of format B. On the other hand, in slot #3 in which the total number of these bits is larger than the predetermined threshold, the HARQ-ACK/SR is transmitted in a short PUCCH of format B, and the CSI is dropped or transmitted using a data resource (for example, a PUSCH).

As shown in FIG. 3C, in the case of (2) above, in both of slot #2 and slot #3, the HARQ-ACK/SR and the CSI are transmitted in a short PUCCH of format A, regardless of the total number of bits of the HARQ-ACK/SR and the CSI.

According to the first example of determining the format, it is possible to appropriately determine the format of a short PUCCH based on the UCI type, so that it is possible to properly fulfill the requirements that vary per UCI type (the requirements being, for example, reduced latency in the event the UCI type is HARQ-ACK, increased capacity in the event the UCI type is CSI, etc.).

<Second Example of Determining Format>

According to a second example of determining the format, a user terminal determines the format of a short PUCCH based on the UCI payload. Here, the UCI payload refers to the overall number of bits of UCI that is transmitted using a short PUCCH.

For example, the user terminal can select format A or format B based on the UCI payload and a predetermined threshold. The predetermined threshold may be configured in the user terminal based on command information (for example, high layer signaling) from a radio base station. The predetermined threshold may be, for example, the payload of format B, or may be the value that is given by multiplying this payload by a predetermined coefficient $\alpha$ ($0 \leq \alpha < 1$).

Figure 4:
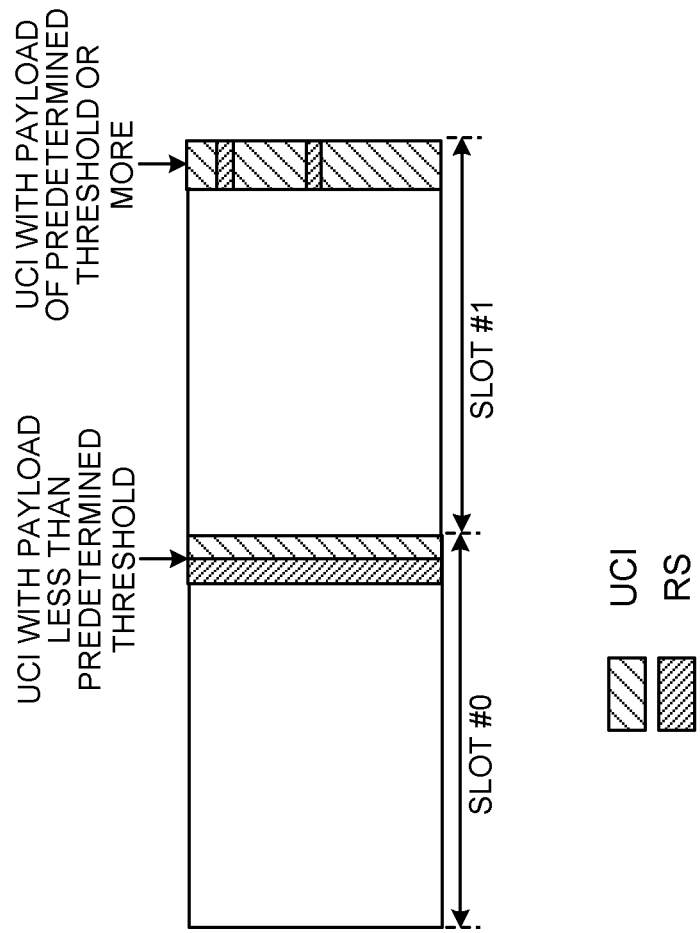
FIG. 4 is a diagram to show a second example of determining a format, according to the first aspect.

FIG. 4 is a diagram showing a second example of determining the format according to the first aspect. As shown in FIG. 4, if the UCI payload is less than a predetermined threshold, the user terminal may select format B. On the other hand, if the UCI payload is larger than the predetermined threshold, the user terminal may select format A.

According to the second example of determining the format, the radio base station can choose achieving either reduced latency or increased capacity. For example, if it is more important to reduce the latency, the radio base station may schedule the DL data so that the payload of HARQ-ACK feedback using a short PUCCH does not grow large (that is, the radio base station can limit the number of component carriers (CC) in carrier aggregation (CA)). As a result of this, HARQ-ACK can be fed back in format B.

On the other hand, if it is more important to increase the capacity, the radio base station may schedule the DL data so that the payload of HARQ-ACK feedback using a short PUCCH grows large (that is, the radio base station can increase the number of CCs in CA). As a result, HARQ-ACK can be fed back in format A.

<Third Example of Determining Format>

According to a third example of determining the format, a user terminal determines the format of a short PUCCH based on physical layer signaling. Here, physical layer signaling (L1 signaling) may refer to, for example, downlink control information (DCI) that is transmitted in a DL control channel. This DCI may be DCI (DL assignment) that is used to schedule DL data (for example, a PDSCH).

For example, the user terminal can select format A or format B based on a predetermined field value in the DCI. Also, when the UCI type is HARQ-ACK/SR and CSI, the user terminal may perform control so that the CSI is transmitted and/or dropped, in accordance with the selected format.

FIG. 5 provide diagrams, each showing the third example of determining the format according to the first aspect. Assume that, in FIGS. 5A and 5B, the UCI type is HARQ-ACK/SR and CSI in slot #0 and slot #1. Also, assume that, in slot #0, the total number of bits of the HARQ-ACK and the CSI is not greater than a predetermined threshold (for example, the payload of format B or a value that is based on the payload), and that, in slot #1, the total number of these bits is greater than the predetermined threshold.

FIG. 5A shows a case where a predetermined field value in DCI indicates format B. In this case, the user terminal transmits the HARQ-ACK/SR using a short PUCCH of format B, and, the user terminal may drop the CSI depending on whether simultaneous transmission of UCI and data is supported or not. For example, if this simultaneous transmission is not supported (or disabled), the user terminal may drop the CSI. On the other hand, if this simultaneous transmission is supported (or enabled), the user terminal may transmit the CSI using a data resource (for example, a PUSCH).

Similar to FIG. 5A, FIG. 5B shows a case where a predetermined field value in DCI indicates format B. Meanwhile, FIG. 5B is different from FIG. 5A in that the user terminal determines whether or not to transmit all of the HARQ-ACK/SR and the CSI, using a short PUCCH of format B, based on the overall number of bits of the HARQ-ACK/SR and the CSI (for example, HARQ-ACK/SR and CSI that are bundled in at least one of the space direction, the frequency direction and the time direction).

As shown with slot #0 of FIG. 5B, when the total number of bits of HARQ-ACK/SR and CSI is not greater than a predetermined threshold, the HARQ-ACK/SR and the CSI are transmitted in a short PUCCH of format B. On the other hand, when the total number of these bits is larger than the predetermined threshold as shown with slot #1 of FIG. 5B, the HARQ-ACK/SR may be transmitted in a short PUCCH of format B, and the CSI may be dropped or transmitted using a data resource (for example, a PUSCH).

FIG. 5C shows a case where a predetermined field value in DCI indicates format A. In this case, regardless of the total number of bits of HARQ-ACK/SR and CSI, in slot #0 and slot #1, the user terminal can transmit the HARQ-ACK/SR and the CSI using a short PUCCH of format A.

According to the third example of determining the format, it is possible to appropriately specify which format is to be applied to a short PUCCH, by using a predetermined field value in DCI, on the network side (for example, in a radio base station).

(Second Aspect)

According to a second aspect of the present invention, a user terminal may control the density of RSs in a short PUCCH in each format based on higher layer signaling and/or physical layer signaling. Here, given the resources in which a short PUCCH is allocated, the density of RSs (RS density) refers to the resources (for example, resource elements (REs)) where RSs are allocated, and may be referred to as "overhead" and/or the like. Now, how the density of RSs is controlled in short PUCCH formats A and B will be described in detail below.

<Format A>

When a user terminal uses a short PUCCH of format A, the RS density in this format A may be (1) configured by higher layer signaling or (2) specified by physical layer signaling, or (3) a plurality of candidate resources for arranging RSs may be configured by higher layer signaling, and at least one of these multiple candidate resources may be specified by physical layer signaling.

FIG. 6 provide diagrams, each showing an example of controlling the RS density in format A according to the second aspect. In FIG. 6B, RSs are frequency-division-multiplexed with UCI and arranged in a larger number of resources than in FIG. 6A. Note that the RS densities shown in FIGS. 6A and 6B are simply examples, and these are not limiting.

(1) When the RS density for format A is configured by higher layer signaling, the user terminal may place RSs in arrangement resources that are configured by higher layer signaling, regardless of the UCI type, the UCI payload, the resource for the short PUCCH and the number of PRBs that are used to transmit the short PUCCH.

(2) When the RS density for format A is specified by physical layer signaling (for example, a predetermined field value in DCI), the user terminal may place RSs in arrangement resources that are specified by physical layer signaling, regardless of the UCI type, the UCI payload, the resource for the short PUCCH and the number of PRBs that are used to transmit the short PUCCH. Note that, as for the predetermined field value in DCI, a resource indicator for PUCCH resources (also referred to as "HARQ-ACK resource indicator," "ARI (ACK/NACK Resource Indicator)," etc.) may be used.

(3) When the RS density for format A is specified by higher layer signaling and physical layer signaling, the user terminal may place RSs in arrangement resources that are specified by physical layer signaling, among a plurality of candidate resources configured by higher layer signaling.

The RS density for format A is not limited to explicit ways of reporting such as those described in above (1) to (3), and can be reported in an implicit manner as well. For example, the RS density for format A may be associated with at least one of the UCI type, the UCI payload, the resource for the short PUCCH and so on.

<Format B>

When the user terminal uses a short PUCCH of format B, the RS density in this format B may be (1) configured by higher layer signaling or (2) specified by physical layer signaling, or (3) a plurality of candidate resources for arranging RSs are configured by higher layer signaling, and at least one of these multiple candidate resources may be specified by physical layer signaling.

FIG. 7 provide diagrams, each showing an example of controlling the RS density in format B according to the second aspect. In FIGS. 7A and 7B, a short PUCCH is constituted by one symbol of normal subcarrier spacing (for example, 15 kHz), and an RS is multiplexed in one symbol of a higher subcarrier spacing than the normal subcarrier spacing.

For example, in FIG. 7A, an RS is arranged in one symbol having a subcarrier spacing of 60 kHz, and, in FIG. 7B, an RS is arranged in one symbol having a subcarrier spacing of 30 kHz. In FIG. 7B, an RS is arranged in one symbol having a lower (narrower) subcarrier spacing than in FIG. 7A. As a result of this, the RS in FIG. 7B is time-division-multiplexed with UCI and arranged in a larger number of resources than in FIG. 7A. Note that the RS densities and subcarrier spacings shown in FIGS. 7A and 7B are simply examples, and these are not limiting.

(1) When the RS density for format B is configured by higher layer signaling, the user terminal may place RSs in arrangement resources that are configured by higher layer signaling, regardless of the UCI type, the UCI payload, the resource for the short PUCCH and the number of PRBs that are used to transmit the short PUCCH.

(2) When the RS density for format B is specified by physical layer signaling (for example, a predetermined field value in DCI), the user terminal may place RSs in arrangement resources that are specified by physical layer signaling, regardless of the UCI type, the UCI payload, the resource for the short PUCCH and the number of PRBs that are used to transmit the short PUCCH. Note that, as for the predetermined field value in DCI, a resource indicator for PUCCH resources (also referred to as "HARQ-ACK resource indicator," "ARI," etc.) may be used.

(3) When the RS density for format B is specified by higher layer signaling and physical layer signaling, the user terminal may place RSs in arrangement resources that are specified by physical layer signaling, among a plurality of candidate resources configured by higher layer signaling.

The RS density for format A is not limited to explicit ways of reporting such as those described in above (1) to (3), and can be reported in an implicit manner as well. For example, the RS density for format B may be associated with at least one of the UCI type, the UCI payload, the resource for the short PUCCH and so on.

According to the second aspect, the RS density in each short PUCCH format can be controlled adequately on the network side (for example, a radio base station).

(Third Aspect)

According to a third aspect of the present invention, how to control the timing to feed back HARQ-ACK (also referred to as "feedback timing," "transmission timing," etc.) will be described. Format A that has been described above is suitable for increasing the capacity per short PUCCH, but is not suitable for shortening the processing time. On the other hand, format B that has been described above is suitable for shortening the processing time, but is not suitable for increasing the capacity per short PUCCH.

Accordingly, when format A is selected for HARQ-ACK, the feedback of this HARQ-ACK is delayed compared to format B. On the other hand, when format B is selected for HARQ-ACK, this HARQ-ACK is fed back quickly, compared to format A. For example, when DL data is received in slot #n, the earliest timing to provide feedback in response to this DL data is (1) slot #n+3 in the event of format A, and (2) slot #n+2 in the event of format B.

Furthermore, when format A is selected for HARQ-ACK, the rescheduling and/or retransmission of the DL data are delayed compared to when format B is selected.

Therefore, according to the third aspect, the user terminal may control the timing for HARQ-ACK feedback based on the short PUCCH format. To be more specific, when HARQ-ACK is included in the UCI type, the user terminal may control the timing to feed back the HARQ-ACK based on the format of the short PUCCH and a predetermined field value in DCI. This DCI may be, for example, DCI (DL assignment) that is used to schedule DL data.

FIG. 8 is a diagram to show an example of controlling the timing of HARQ-ACK feedback according to the third aspect. In FIG. 8, each value of a predetermined field in DCI specifies, per format, the timing to feed back HARQ-ACK, when DL data is received in slot #n (the offset value to apply to slot #n). Note that, in FIG. 8, the predetermined field in DCI is two bits, but this may be one bit, or may be three bits or more.

For example, the predetermined field value "00" in DCI is associated with the feedback timing n+A0 for format A and the feedback timing n+B0 for format B. As mentioned earlier, since the latency (processing time) reduction effect of format A is less than that of format B, A0>B0 holds. The same relationship holds among the feedback timings n+A1 to n+A3 and the feedback timings n+B1 to n+B3, which are associated with the predetermined DCI field values "01" to "11."

In this way, when the timing to feed back HARQ-ACK is indicated explicitly by a predetermined field value in DCI, even if the predetermined field value is the same, the predetermined field value may be interpreted differently depending on which short PUCCH format is selected by the user terminal or designated by the network. That is, even if DL data is received in same slot #n, HARQ-ACK in response to this DL data may be fed back at different timings depending on the format of the short PUCCH.

Note that, in FIG. 8, information to represent the feedback timings (for example, A0 to A3 and B0 to B3 in FIG. 8), associated with each predetermined field value of DCI, provided per format, may be defined in advance in the specification, or may be configured in user terminals by way of higher layer signaling.

According to the third aspect of the present invention, it is possible to control, on the network side (for example, a radio base station), the timing to feed back HARQ-ACK from a user terminal to timings associated with each short PUCCH format.

(Fourth Aspect)

With a fourth aspect of the present invention, control of short PUCCH resources will be described. According to the fourth aspect, a user terminal may control the resource for a short PUCCH for use in transmitting UCI based on the format of the short PUCCH.

Here, the resource for a short PUCCH may be at least one of a time resource (for example, a symbol), a frequency resource (for example, a PRB), a space resource (for example, a layer) and a code resource (for example, an orthogonal spreading code such as an OCC (Orthogonal Cover Code) and a cyclic shift value).

To be more specific, the user terminal may decide the resource for a short PUCCH based on the format of the short PUCCH and a predetermined field value in DCI. The DCI may be, for example, DCI (DL assignment) that is used to schedule DL data.

FIG. 9 is a diagram to show an example of controlling short PUCCH resources, according to the fourth aspect. In FIG. 9, each value of a predetermined field in DCI specifies the resource for a short PUCCH, provided per format. Note that, in FIG. 9, the predetermined field in DCI is two bits, but this may be one bit, or may be three bits or more.

For example, the predetermined field value "00" in DCI is associated with the resource A0 for format A and the resource B0 for format B. Likewise, the predetermined field values "01" to "11" in DCI are associated with resources A1 to A3 for format A and resources B1 to B3 for format B, respectively.

In this way, when the resource for a short PUCCH is indicated explicitly by a predetermined field value in DCI, even if the predetermined field value is the same, the predetermined field value may be interpreted differently depending on which short PUCCH format is selected by the user terminal or designated by the network.

Note that, in FIG. 9, information to represent the resources (for example, resources A0 to A3 and resources B0 to B3 in FIG. 9), associated with each predetermined field value in DCI, provided per format, may be defined in advance in the specification, or may be configured in user terminals by way of higher layer signaling.

According to the fourth aspect, it is possible to control short PUCCH resources on a per format basis, on the network side (for example, radio base station).

(Other Aspects)

To portray yet another aspect of the present invention, control of UCI transmission in a slot in which a channel state sounding reference signal (SRS) is transmitted will be described. The transmission of the SRS may be configured by higher layer signaling or may be specified by physical layer signaling. In the event higher layer signaling is applied, for example, the SRS may be configured in the last symbol, and, if a gap period is provided at the end of the slot, the SRS may be provided in the closest position to the gap period.

Also, UCI and an SRS may be multiplexed. For example, in the event format B is used, if, in one symbol of normal subcarrier spacing (for example, 15 kHz), multiple symbols of a higher (wider) subcarrier spacing than the normal subcarrier spacing (for example, four symbols at a subcarrier spacing of 60 kHz) are provided, UCI, and the DM-RS and the SRS that are to be used to demodulate this UCI may be time-division-multiplexed in different symbols of this higher subcarrier spacing. Also, in the event format A is used, the UCI, the DM-RS and the SRS may be frequency-division-multiplexed.

When a short PUCCH and an SRS are frequency-division-multiplexing, these may be transmitted at the same subcarrier spacing. In this case, the short PUCCH and the SRS can be orthogonalized, so that the interference the SRS gives to the PUCCH can be reduced. In this case, the short PUCCH and the SRS can be transmitted by adjusting the subcarrier spacing of the SRS with the subcarrier spacing of the short PUCCH. Meanwhile, the subcarrier spacing of the short PUCCH that is frequency-division-multiplexed with the SRS may be determined based on what subcarrier spacing is configured for the SRS.

(Radio Communication System)

Now, the structure of a radio communication system according to the present embodiment will be described below. In this radio communication system, each radio communication method according to the above-described embodiments is employed. Note that the radio communication methods according to the herein-contained aspects of the present invention may be applied individually, or two or more of them may be combined and applied.

Figure 10:
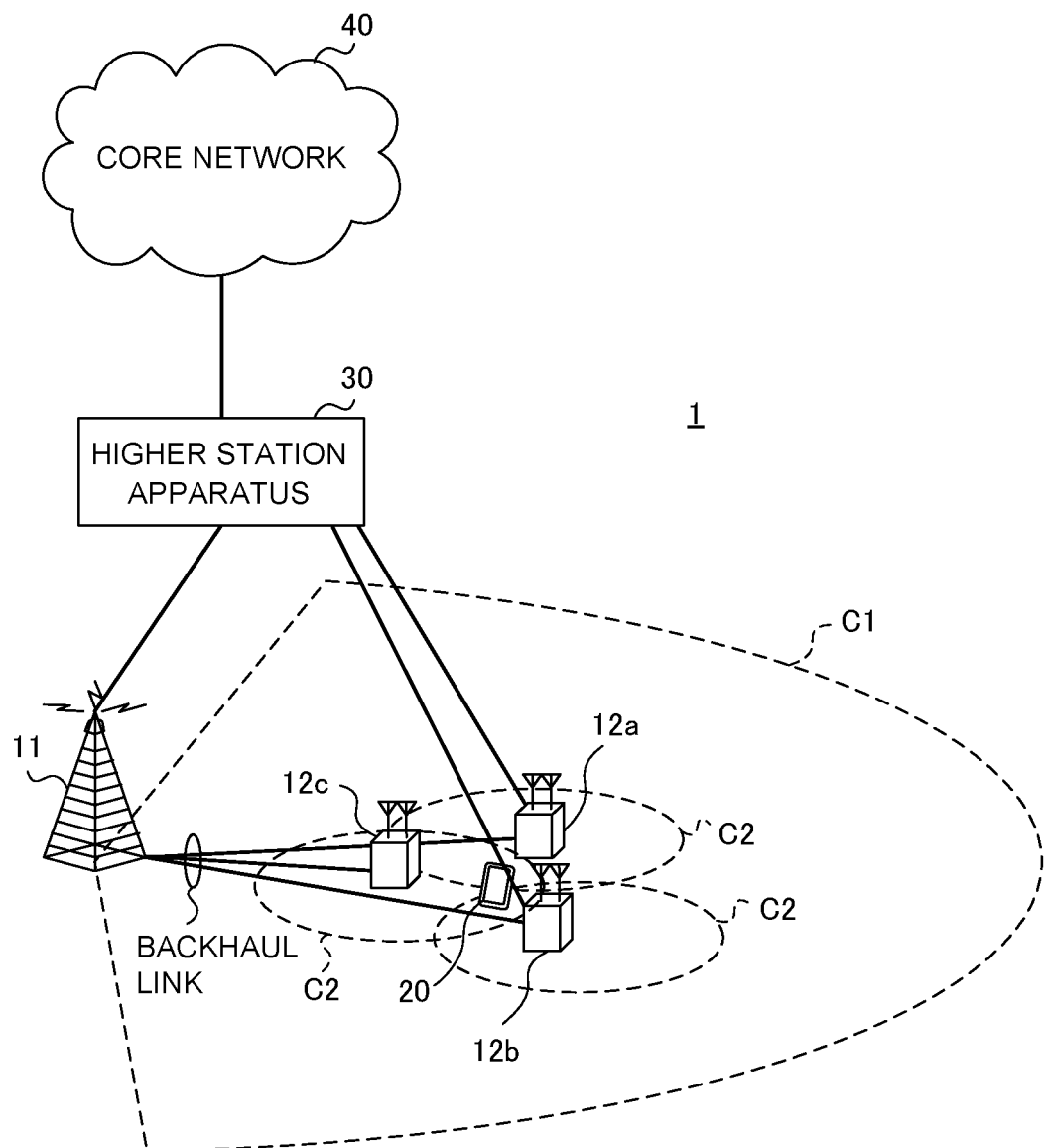
FIG. 10 is a diagram to show an example of a schematic structure of a radio communication system according to the present embodiment.

FIG. 10 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. The radio communication system 1 may be also referred to as "SUPER 3G," "LTE-A (LTE-Advanced)," "IMT-Advanced," "4G," "5G," "FRA (Future Radio Access)," "NR (New RAT: New Radio Access Technology)," and so on.

The radio communication system 1 shown in FIG. 10 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted.

Here, "numerology" refers to communication parameters in the frequency direction and/or the time direction (for example, at least one of the subcarrier spacing (subcarrier interval), the bandwidth, the symbol duration, the time duration of CPs (CP duration), the subframe duration, the time duration of TTIs (TTI duration), the number of symbols per TTI, the radio frame structure, the filtering process, the windowing process, and so on). In the radio communication system 1, for example, subcarrier spacings of, for example, 15 kHz, 30 kHz, 60 kHz, and 120 kHz may be supported.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A, 5G, NR and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

Also, in the radio communication system 1, a multi-carrier waveform (for example, the OFDM waveform) may be used, or a single-carrier waveform (for example, the DFT-s-OFDM waveform) may be used.

In the radio communication system 1, a DL shared channel (PDSCH (Physical Downlink Shared CHannel), which is also referred to as, for example, a "DL data channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Block) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. It is possible to communicate HARQ retransmission control information (ACK/NACK) in response to the PUSCH using at least one of the PHICH, the PDCCH and the EPDCCH.

In the radio communication system 1, a UL shared channel (PUSCH: Physical Uplink Shared CHannel, which is also referred to as "UL data channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI), including at least one of DL signal retransmission control information (A/N), channel state information (CSI) and so on, is communicated in the PUSCH or the PUCCH. By means of the PRACH, random access preambles for establishing connections with cells are communicated.

<Radio Base Station>

Figure 11:
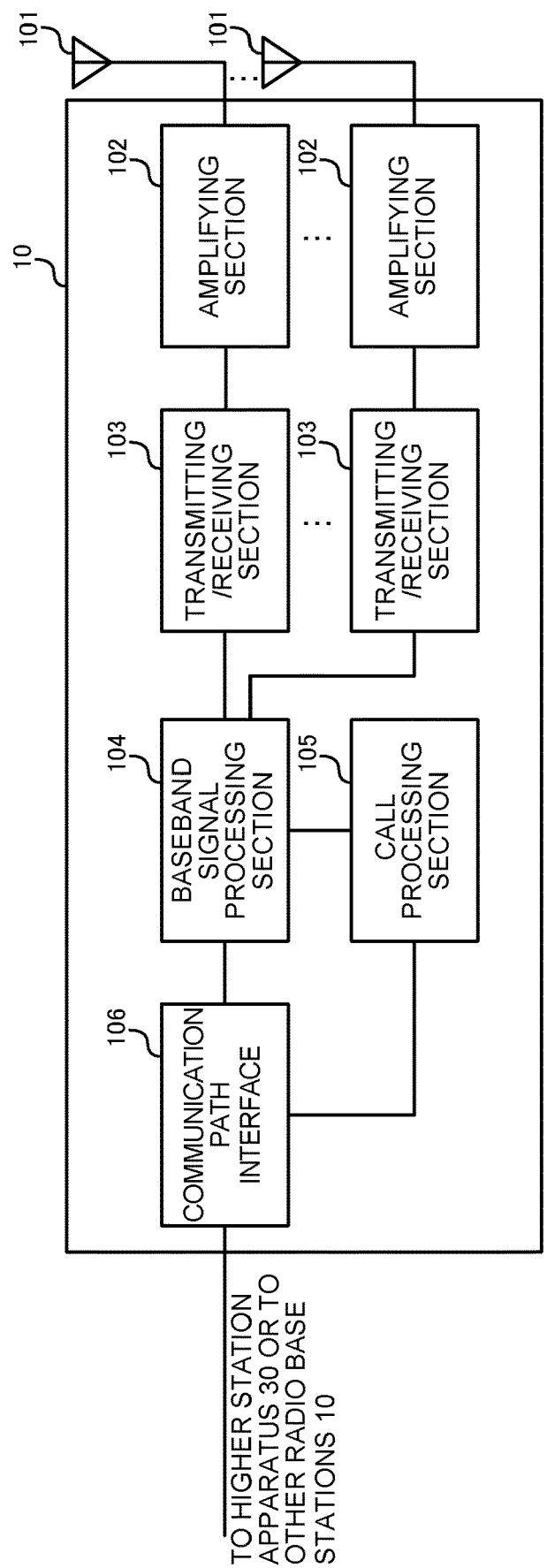
FIG. 11 is a diagram to show an example of an overall structure of a radio base station according to the present embodiment.

FIG. 11 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on DL is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

In addition, the transmitting/receiving sections 103 transmit DL signals (including at least one of a DL data signal, a DL control signal and a DL reference signal) to the user terminal 20, and receive UL signals (including at least one of a UL data signal, a UL control signal and a UL reference signal) from the user terminal 20.

Furthermore, the transmitting/receiving sections 103 receive UCI from the user terminal 20 via a UL data channel (for example, the PUSCH) or a UL control channel (for example, a short PUCCH and/or a long PUCCH). This UCI may include at least one of an HARQ-ACK in response to a DL data channel (for example, the PDSCH), CSI, an SR, a beam index (BI) and a buffer status report (BSR).

In addition, the transmitting/receiving sections 103 may transmit control information (for example, DCI) that represents the format of a UL control channel (for example, a short PUCCH) via physical layer signaling (L1 signaling) (see the third example of determining the format according to the first aspect).

In addition, the transmitting/receiving sections 103 may transmit control information that represents the RS density in a UL control channel (for example, a short PUCCH), per format, via higher layer signaling and/or physical layer signaling (see the second aspect).

In addition, the transmitting/receiving sections 103 may transmit control information (for example, DCI) that indicates the timing to feed back HARQ-ACK in a UL control channel (for example, a short PUCCH), per format, via physical layer signaling (L1 signaling) (see the third aspect).

In addition, the transmitting/receiving sections 103 may transmit control information (for example, DCI) that indicates the resource for a UL control channel (for example, a short PUCCH), per format, via physical layer signaling (L1 signaling) (the fourth aspect).

Figure 12:
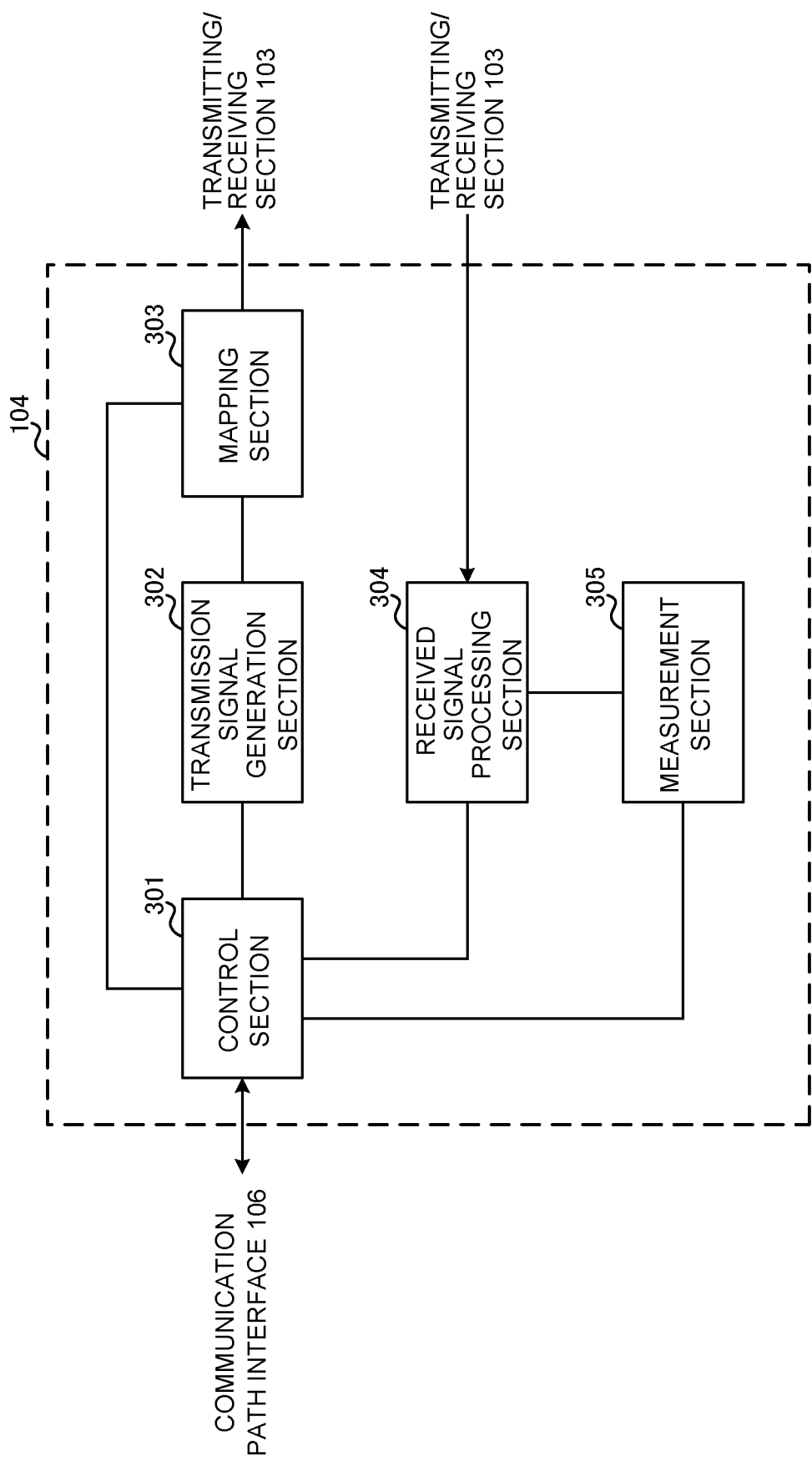
FIG. 12 is a diagram to show an example of a functional structure of a radio base station according to the present embodiment.

FIG. 12 is a diagram to show an example of a functional structure of a radio base station according to the present embodiment. Note that, although FIG. 12 primarily shows functional blocks that pertain to characteristic parts of the present embodiment, the radio base station 10 has other functional blocks that are necessary for radio communication as well. As shown in FIG. 12, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304 and the measurements by the measurement section 305.

To be more specific, the control section 301 schedules user terminals 20. To be more specific, the control section 301 may perform scheduling and/or retransmission control with respect to DL data and/or UL data channels based on UCI (for example, CSI) from user terminals 20.

Also, the control section 301 may exert control so that the format of a UL control channel (for example, a short PUCCH) for use in transmitting UCI is selected from a plurality of formats, including format A (first format), in which UCI and an RS are frequency-division-multiplexed, and format B (second format), in which UCI and an RS are time-division-multiplexed, and control information (for example, DCI) to represent this format is transmitted via physical layer signaling (see the third example of determining the format according to the first aspect).

Also, the control section 301 may exert control so that the RS density in a UL control channel (for example, a short PUCCH) is determined, per format, and control information to represent this RS density is transmitted via higher layer signaling and/or physical layer signaling (see the second aspect).

Also, the control section 301 may exert control so that the timing to feed back HARQ-ACK in a UL control channel (for example, a short PUCCH) is determined, per format, and control information (for example, DCI) to represent this feedback timing is transmitted via physical layer signaling (L1 signaling) (see the third aspect).

Furthermore, the control section 301 may exert control so that the resource for a UL control channel (for example, a short PUCCH) is determined, per format, and control information (for example, DCI) to represent this resource is transmitted via physical layer signaling (L1 signaling) (see the fourth aspect).

The control section 301 may control the received signal processing section 304 to perform the receiving process for UCI from the user terminal 20 in accordance with the format of the UL control channel.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) based on commands from the control section 301, and outputs these signals to the mapping section 303.

For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or mapping apparatus that can be described based on general understanding of the technical field to which the present invention pertains can be used.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may outputs the received signals, the signals after the receiving processes and so on, to the measurement section 305. In addition, the received signal processing section 304 performs UCI receiving processes based on the UL control channel format commanded from the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

<User Terminal>

Figure 13:
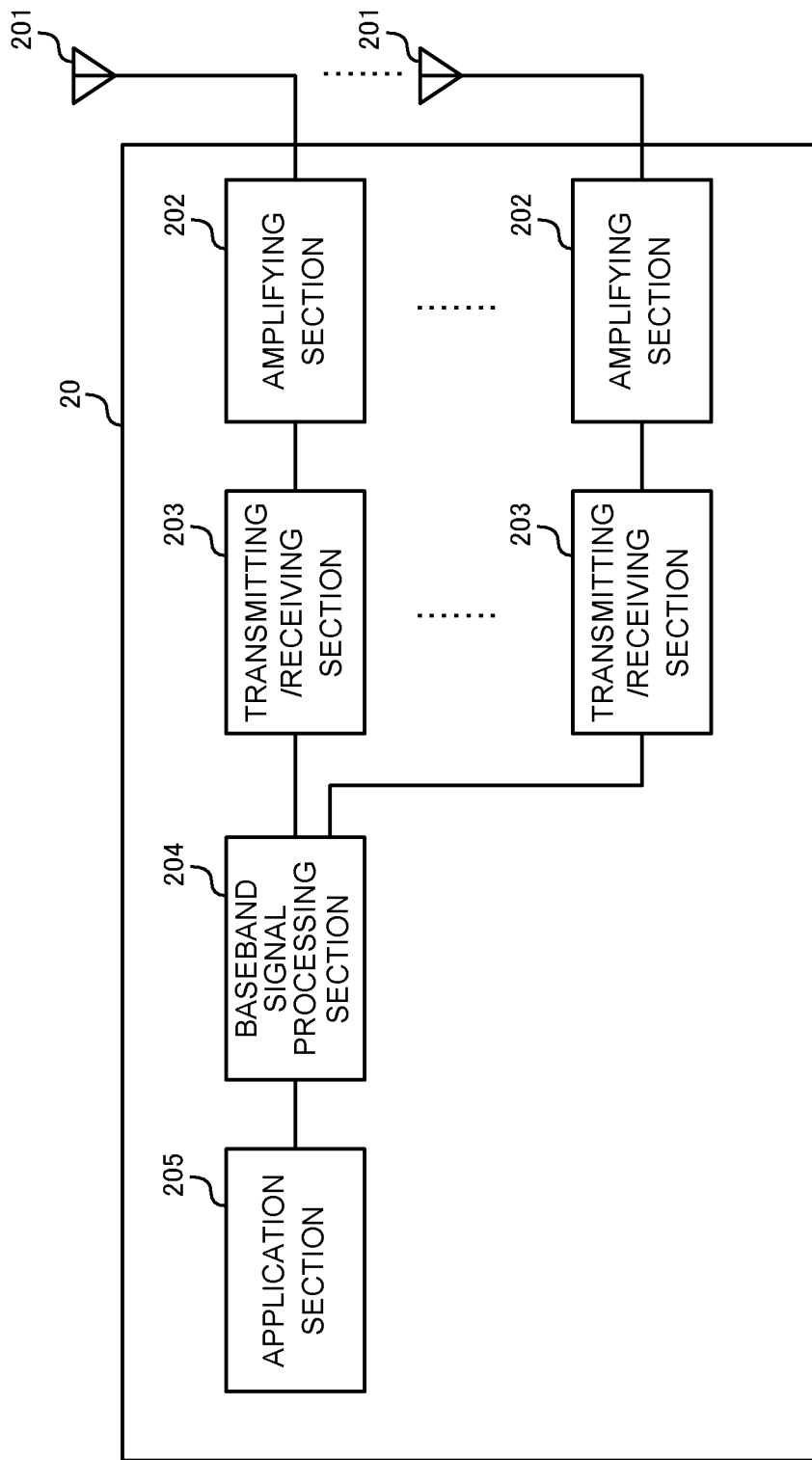
FIG. 13 is a diagram to show an example of an overall structure of a user terminal according to the present embodiment.

FIG. 13 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. The UCI is also subjected to at least one of channel coding, rate matching, puncturing, a DFT process and an IFFT process, and the result is forwarded to each transmitting/receiving section 203.

The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive the DL signals (including DL data signals, DL control signals, DL reference signals, etc.) of the numerology configured in the user terminal 20, and transmits the UL signals (including UL data signals, UL control signals, UL reference signals, etc.) of the numerology.

In addition, the transmitting/receiving sections 203 transmit the UCI to the radio base station 10 using a UL data channel (for example, PUSCH) or a UL control channel (for example, a short PUCCH and/or a long PUCCH).

In addition, the transmitting/receiving sections 203 may receive control information (for example, DCI) that represents the format of a UL control channel (for example, a short PUCCH) through physical layer signaling (L1 signaling) (see the third example of determining the format according to the first aspect).

In addition, the transmitting/receiving sections 203 may receive control information that represents the RS density in a UL control channel (for example, a short PUCCH), per format, via higher layer signaling and/or physical layer signaling (see the second aspect).

In addition, the transmitting/receiving sections 203 may receive control information (for example, DCI) that indicates the timing to feed back HARQ-ACK in a UL control channel (for example, a short PUCCH), per format, via physical layer signaling (L1 signaling) (see the third aspect).

In addition, the transmitting/receiving sections 203 may receive control information (for example, DCI) that indicates the resource for a UL control channel (for example, a short PUCCH), per format, via physical layer signaling (L1 signaling) (see the fourth aspect).

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

Figure 14:
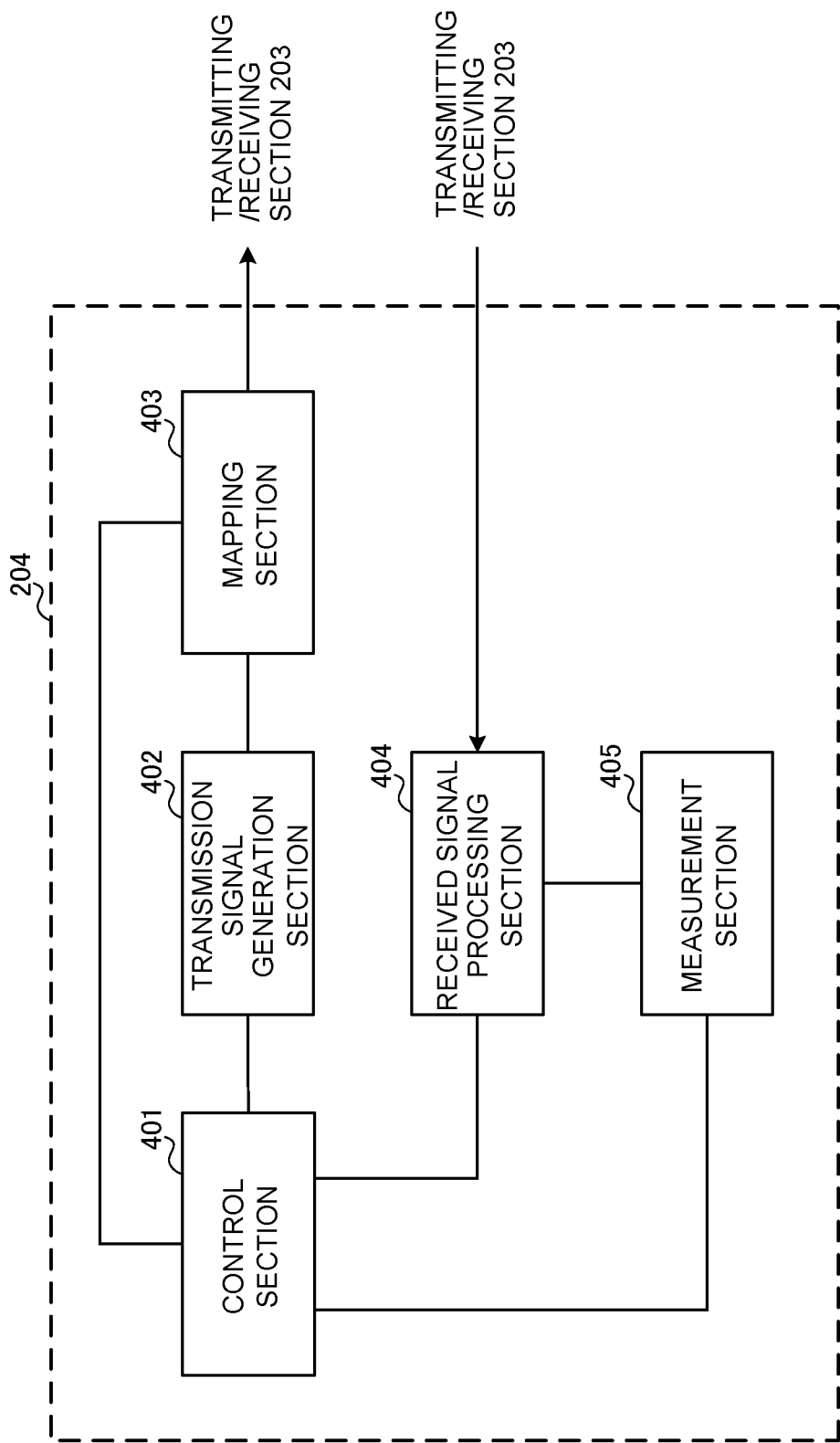
FIG. 14 is a diagram to show an example of a functional structure of a user terminal according to the present embodiment.

FIG. 14 is a diagram to show an example of a functional structure of a user terminal according to the present embodiment. Note that, although FIG. 14 primarily shows functional blocks that pertain to characteristic parts of the present embodiment, the user terminal 20 has other functional blocks that are necessary for radio communication as well. As shown in FIG. 14, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the UL signal receiving processes in the received signal processing section 404, the measurements in the measurement section 405 and so on.

Furthermore, the control section 401 controls the UL control channel to be used to transmit UCI from the user terminal 20, based on explicit commands from the radio base station 10 or implicit decisions in the user terminal 20.

Furthermore, the control section 401 may decide the format for a UL control channel (for example, a short PUCCH) for use in transmitting UCI, from a plurality of formats, including format A (first format), in which UCI and an RS are frequency-division-multiplexed, and format B (second format), in which UCI and an RS are time-division-multiplexed.

In addition, the control section 401 may decide the format for a UL control channel (for example, short PUCCH) for use in transmitting UCI based on at least one of the UCI type, the UCI payload and physical layer signaling (see the first to the third examples of determining the format according to the first aspect).

Furthermore, the control section 401 may exert control, based on the format of a UL control channel (for example, a short PUCCH) for use in transmitting UCI, so that at least part of the UCI is dropped or transmitted (see the first and third examples of determining the format according to the first aspect). For example, if the UCI type for format B is HARQ-ACK/SR and UCI, the control section 401 may drop at least one CSI, or transmit the CSI in a UL data channel (for example, a PUSCH). Also, when the total number of bits of HARQ-ACK/SR and UCI is not larger than a predetermined threshold, the control section 401 may transmit all of the HARQ-ACK/SR and the UCI in a UL control channel (for example, a short PUCCH) of format B.

In addition, the control section 401 may control the density of reference signals in the format of a UL control channel (for example, a short PUCCH) for use in transmitting UCI, based on higher layer signaling and/or physical layer signaling (see the second aspect).

In addition, the control section 401 may determine the timing to feed back HARQ-ACK based on the format of a UL control channel (for example, a short PUCCH) for use in transmitting UCI, and a predetermined field value in DCI (see the third aspect).

In addition, the control section 401 may decide the resource for a UL control channel (for example, a short PUCCH) for use in transmitting UCI based on the format of the UL control channel and a predetermined field value in DCI (see the fourth aspect).

For the control section 401, a controller, a control circuit or control apparatus that can be described based on general understanding of the technical field to which the present invention pertains can be used.

In the transmission signal generation section 402, UL signals (including UL data signals, UL control signals, UL reference signals, UCI, etc.) are generated (including, for example, encoding, rate matching, puncturing, modulation, etc.) based on commands from the control section 401, and output to the mapping section 403. For the transmission signal generation section 402, a signal generator, a signal generation circuit or signal generation apparatus that can be described based on general understanding of the technical field to which the present invention pertains can be used.

The mapping section 403 maps the UL signals generated in the transmission signal generation section 402 to radio resources based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 15:
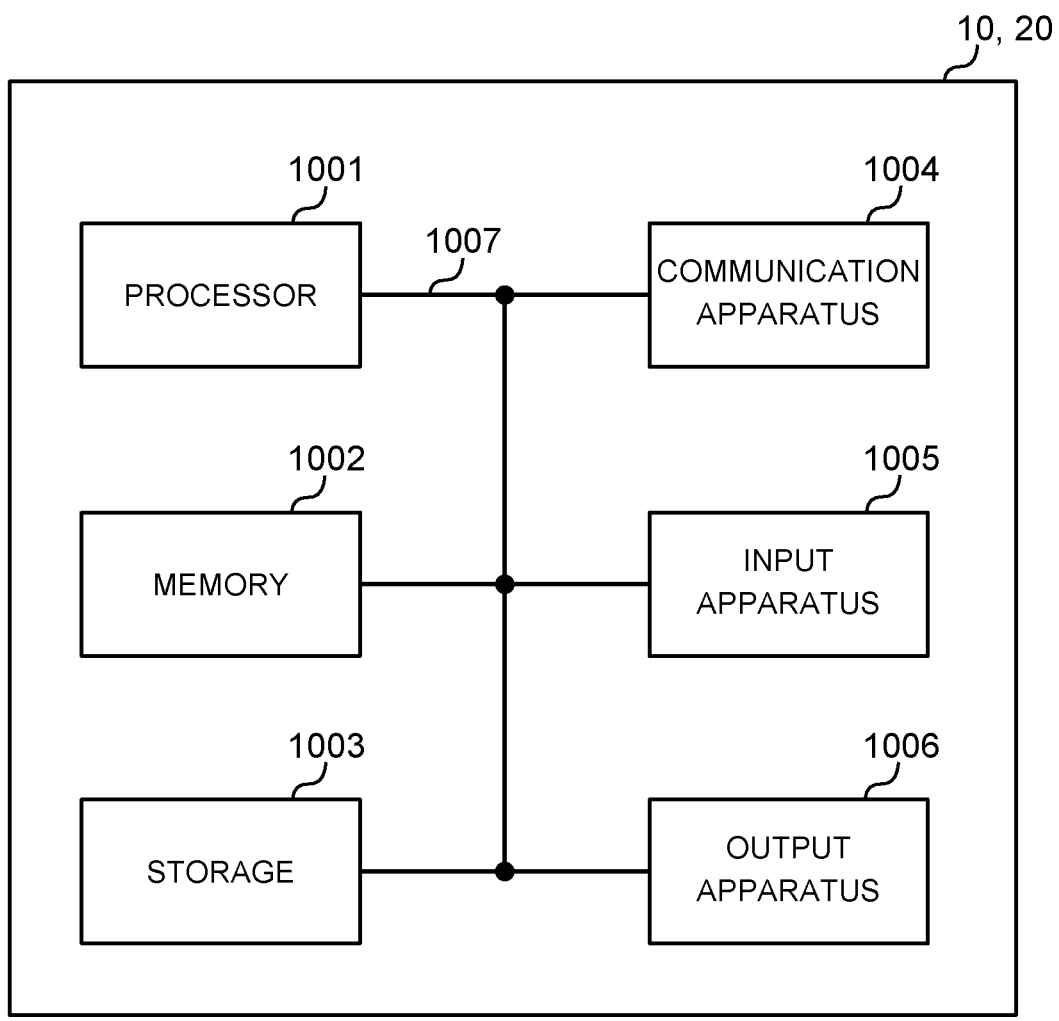
FIG. 15 is a diagram to show an example hardware structure of a radio base station and a user terminal according to the present embodiment.

For example, the radio base station, user terminals and so on according to embodiments of the present invention may function as a computer that executes the processes of the radio communication method of the present invention. FIG. 15 is a diagram to show an example of a hardware structure of a radio base station and a user terminal according to one embodiment of the present invention.

Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, one ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-242218, filed on Dec. 14, 2016, including the specification, drawings and abstract, is incorporated herein by reference in its entirety.

The invention claimed is:

1. A terminal, comprising:
 a processor that determines a format of an uplink (UL) control channel that is used to transmit an uplink control information (UCI), based on a number of bits of the UCI, from a plurality of formats, including:
  a first format, in which the UCI and a demodulation reference signal are frequency-division-multiplexed, and
  a second format, in which the UCI and the demodulation reference signal are time-division-multiplexed; and
 a transmitter that transmits the UCI.

2. The terminal according to claim 1, wherein if an overall number of bits of the UCI is greater than a threshold, the processor determines the first format.

3. A radio communication method for a terminal comprising:
 determining a format of an uplink (UL) control channel that is used to transmit an uplink control information (UCI), based on a number of bits of the UCI, from a plurality of formats, including:

a first format, in which the UCI and a demodulation reference signal are frequency-division-multiplexed, and a second format, in which the UCI and the demodulation reference signal are time-division-multiplexed; and transmitting the UCI.

4. A base station comprising:

a receiver coupled to a processor, wherein the receiver receives an uplink control information (UCI), and wherein a format of an uplink (UL) control channel that is used to transmit the UCI is determined, based on a number of bits of the UCI, from a plurality of formats, including:

a first format, in which the UCI and a demodulation reference signal are frequency-division-multiplexed, and a second format, in which the UCI and the demodulation reference signal are time-division-multiplexed.

5. A system comprising a terminal and a base station, wherein:

the terminal comprises:

a processor that determines a format of an uplink (UL) control channel that is used to transmit an uplink control information (UCI), based on a number of bits of the UCI, from a plurality of formats, including:

a first format, in which the UCI and a demodulation reference signal are frequency-division-multiplexed, and a second format, in which the UCI and the demodulation reference signal are time-division-multiplexed; and a transmitter that transmits the UCI, and the base station comprises:

a receiver that receives the UCI.

* * * * *